United States Patent [19]

Greenwood et al.

[11] Patent Number: 4,942,766

[45] Date of Patent: Jul. 24, 1990

[54] TRANSDUCER

[75] Inventors: John C. Greenwood, Harlow; James M. Naden, Dartford, both of Great Britain

[73] Assignee: STC PLC, London, England

[21] Appl. No.: 266,818

[22] Filed: Nov. 3, 1988

[30] Foreign Application Priority Data

Mar. 26, 1988 [GB] United Kingdom ............... 8807273

[51] Int. Cl.$^5$ .............................................. G01L 9/14
[52] U.S. Cl. ........................................ 73/704; 73/705; 73/723; 250/231.19; 250/201.1
[58] Field of Search ............... 73/702, 704, 705, 723, 73/728, DIG. 1, DIG. 11, 653, 655, 862.59; 250/231 P; 331/65, 155

[56] References Cited

U.S. PATENT DOCUMENTS

| 4,379,226 | 4/1983 | Sichling et al. | 73/704 |
| 4,503,715 | 3/1985 | Greenwood | 73/862.59 |
| 4,691,578 | 9/1987 | Herzl | 73/861.38 |
| 4,772,786 | 9/1988 | Langdon | 250/231 P |

*Primary Examiner*—John Chapman
*Assistant Examiner*—Michele Simons
*Attorney, Agent, or Firm*—Lee, Mann, Smith, McWilliams & Sweeney

[57] ABSTRACT

In a transducer, e.g. a pressure transducer, the sensing element comprises a torsional oscillator provided with magnetic means for feedback of signals to maintain oscillation. Typically the sensing element is formed by selective etching from a body of single crystal silicon.

5 Claims, 2 Drawing Sheets

TRANSDUCER

This invention relates to transducers, and in particular to transducers in which measurement of a parameter, e.g. pressure, is determined from the vibrational frequency of a resonant element.

BACKGROUND OF THE INVENTION

Resonant transducers are used in a number of applications e.g. for the measurement of temperature or pressure. These devices are maintained in a state of resonance by the application of drive signals of appropriate frequency and phase. Conventionally the drive is applied as an electrical signal. When the transducer is to be used in a hazardous enviroment it is clearly desirable to avoid the use of electrical connections. Optical coupling to and from a transducer is inherently safe. However, optical coupling introduces the problems of providing drive signals to the transducer to maintain oscillation.

The object of the invention is to minimise or to overcome the disadvantage.

SUMMARY OF THE INVENTION

According to one aspect of the invention there is provided a transducer device, including a resonator element whose vibrational frequency is a function of a parameter to be measured, means for directing a light signal on to the transducer whereby the signal is modulated with said frequency so as to provide a measure of the parameter, and means for deriving from the optical signal an oscillatory electromagnetic field whereby vibration of the resonator is maintained.

According to another aspect of the invention there is provided an optically operable transducer device, including a torsional resonator element whose vibrational frequency is a function of a parameter to be measured, a permanent magnet mounted on said resonator, an electromagnet associated with said resonator, means for directing a light beam on to said resonator whereby to provide a first light beam modulated with a frequency corresponding to the resonator frequency and a second, reflected, light beam whose angle of reflection corresponds to the angular position of the resonator element, and photovoltaic means coupled to the electromagnet and arranged so as to receive the second light beam at a predetermined angle of reflection whereby to generate an oscillatory current, the arrangement being such that the magnetic field generated by the electromagnet responsive to said oscillatory current interacts with the field of the permanent magnet whereby to maintain the resonator element in a state of oscillation.

BRIEF DESCRIPTION OF THE DRAWINGS

Embodiments of the invention will now be described with refernece to the accompanying drawings in which.

DESCRIPTION OF PREFERRED EMBODIMENTS

Figure 1:
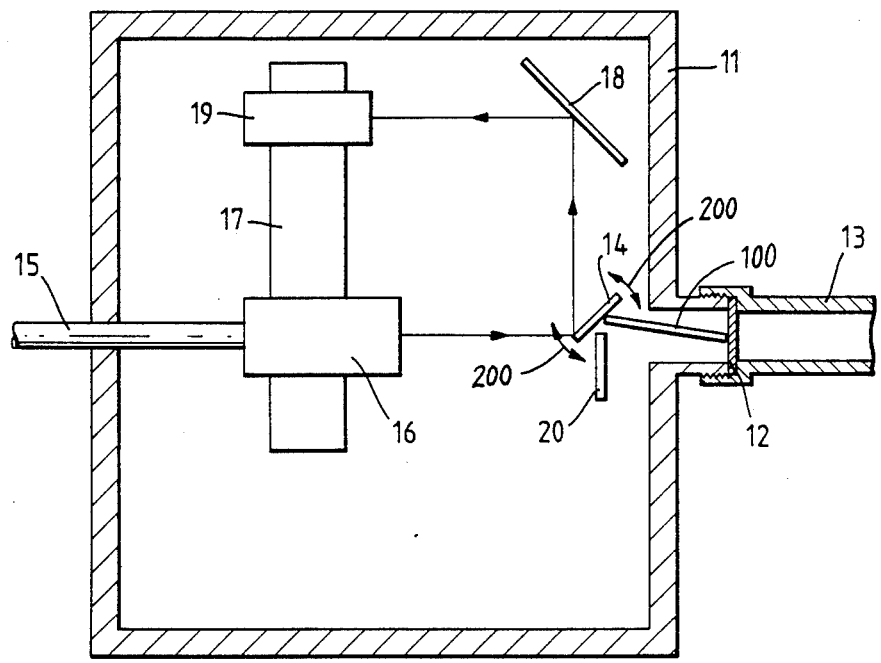
FIG. 1 is a plan view of a resonant sensor device.
Figure 2:
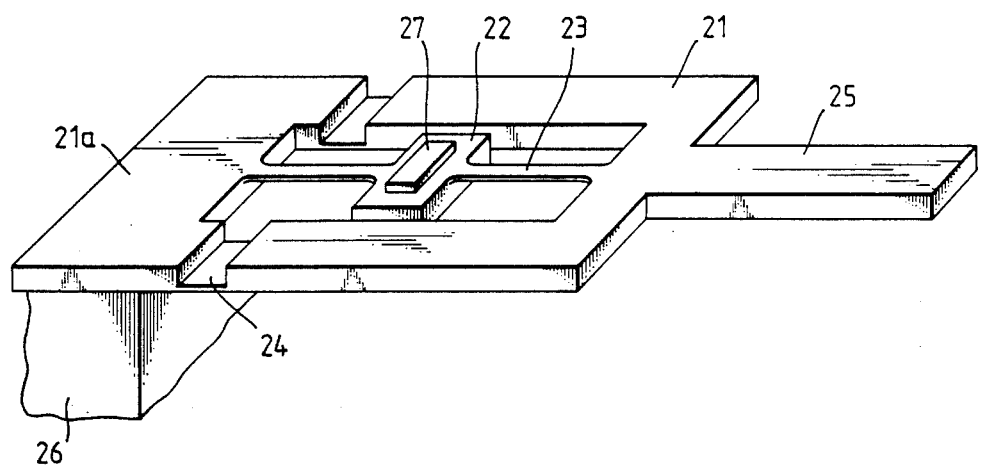
FIG. 2 shows a resonator structure for use with the device of FIG. 1.
Figure 3:
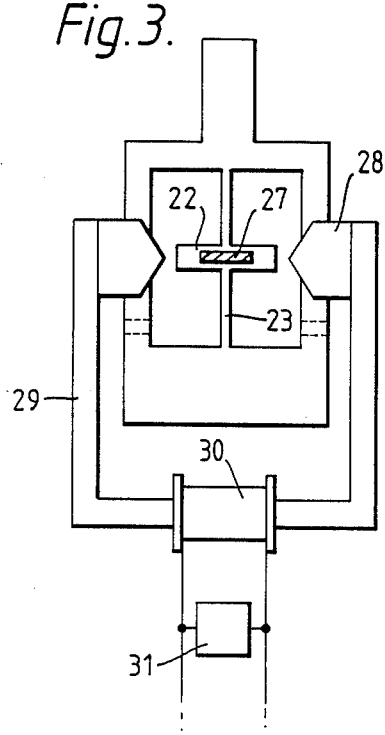
FIG. 3 shows the magnetic drive arrangement associated with the resonator of FIG. 2.
Figure 4:
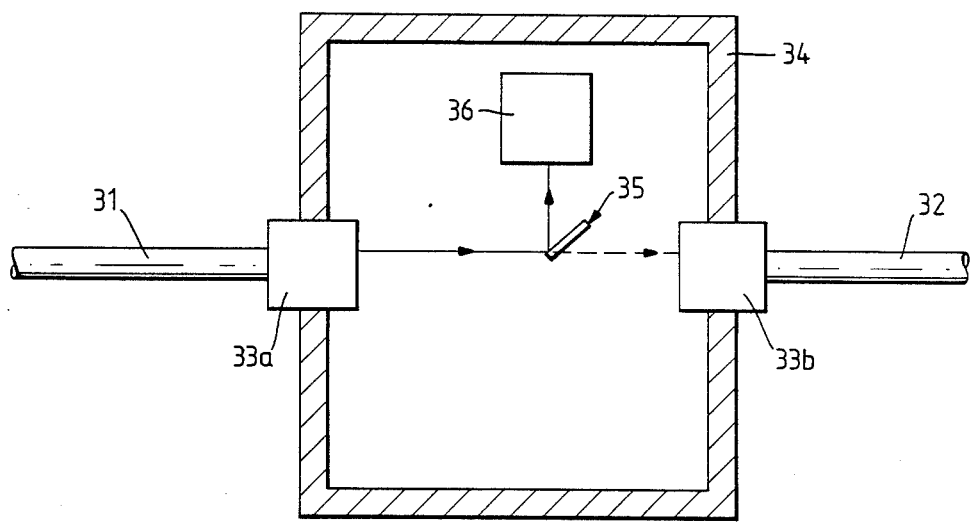
FIG. 4 shows an alternative sensor device.

Referring to FIGS. 1 to 3, the sensor device is disposed within a housing 11 (FIG. 1) sealed by a flexible diaphragm 12 which, in use, is exposed via tube 13 to a source of pressure to be measured. The housing 11 may be evacutated to provide an absolute pressure reference. A strain responsive resonator generally indicated by the reference 14 is mounted within the housing 11 and is coupled to the diaphragm 12 via a push-rod 100.

Displacement of the diaphragm 12 in response to a pressure applied thereto applies a corresponding strain to the resonator 14 via the push-rod 100. The resonator includes a torsional oscillatory element and is driven via an optical signal applied to the arrangement via an optical fiber 15 coupled to a lens assembly 16 mounted on a carrier 17 within the housing 11. Light from the lens assembly 16 is reflected from the resonator 14 via a mirror 18 to a photodetector 19 also mounted on the carrier. A further mirror 20 is disposed behind the resonator 14. The arrangement is such that, when the resonator 14 undergoes torsional oscillation indicated by the double headed arrows 200 at a frequency corresponding to the strain applied via the push-rod, the further mirror 20 is periodically exposed to and obscured from the light beam. This provides a reflected light signal modulated with the resonator frequency to the film 15 for transmission to a remote sensor station. The manner in which the resonator is maintained in a state of torsional oscillation by electromagnetic coupling under the control of the input light signal will be described below with reference to FIGS. 2 and 3.

When a pressure is applied to the diaphragm 12 the corresponding strain applied to the resonator 14 via the push-rod 100 results in a frequency change characteristic of the pressure. This frequency change is detected as a change in the modulation frequency of the return signal on the optical fiber 15.

Typically the resonator comprises a structure etched from a body of single crystal silicon. The resonator structure employed in the sensor device of FIG. 1 is shown in FIG. 2 and comprises a rectangular support frame 21 within which a resonator element 22 is mounted on taut support filaments 23. Flexible hinges 24 are provided in the frame 21 to permit displacement of the frame whereby a corresponding tension is applied to the filaments 23. A lever arm 25 may be provided extending from the frame 21 whereby displacement of the frame about the hinges 24 is effected. In the arrangement of FIG. 1, the push-rod is applied to this lever 25 to effect displacement of the frame 21 thereby determining the frequency of the resonator frame also includes a mounting portion 21a adjacent the hinges 24 whereby the resonator is affixed to a support 26. Displacement of the frame in response to a similar displacement of the diaphragm 12 (FIG. 1) causes a corresponding change in tension in the filaments 23 thus changing the frequency of torsional oscillation of the resonator element 22. A permanent magnet 27 is mounted on the element 22, the field of the magnet being in a direction substantially perpendicular to the plane of the element. The resonator structure of FIG. 2 is located between the poles 28 (FIG. 3) of a yoke 29 of a magnetically permeable material, a coil 30 being wound around the yoke. The coil 30 is coupled to a capacitor 31 to form a tuned circuit whose frequency is substantially equal to the resonator frequency. In some applications the capacitor 31 may be dispensed with. The feedback is then untuned aperiodic feedback. This reduces the feedback efficiency but allows operation of the resonator over a frequency range considerably wider than that provided by a tuned circuit. Advantageously, the yoke 29 comprises a metallic glass. The resonator element 22 may be coated with gold to improve its optical reflectivity.

In use, continuous wave (CW) light from a light source, e.g. a semiconductor laser disposed at the remote station, is directed on to the resonator element via optical fiber 15 provided with beam termination 16. Light is reflected from the resonator element at an angle corresponding to the instantaneous position of the resonator element. This reflected light signal is received by the photodetector 19 (FIG. 1) and 15 thereby converted to a corresponding oscillatory electrical signal. This signal is fed back to the tuned circuit to induce a corresponding oscillatory signal in the coil 30, the signal being delayed by a phase angle of $\pi/2$ in relation to the resonator oscillation. The magnetic fields of the magnet and coil are mutually perpendicular. The presence of a current in the coil thus applies a torsional couple to the resonator element. This causes a rotation of the element and a consequent reduction in the intensity of light received by the photodetector 19. The reduction of the current allows the resonator element to return towards its rest position. The coil current then increases again to maintain oscillation. The resonant frequency of the LC circuit defined by the coil and the capacitor is chosen to be slightly below the resonator frequency. The $\pi/2$ phase lag introduced by the inductance of the coil then ensures maximum coupling to the resonator.

The choice of photodetector depends on the optical wavelength employed. For example, a silicon photodiode may be employed in conjunction with a wavelength of 850 nm.

What is claimed is:

1. A sensor device for the remote measurement of pressure, the device comprising:

a closed pressure tight housing;

a flexible pressure responsive diaphragm associated with the housing;

a torsional resonator mounted within the housing and having frequency determining means mechanically coupled to the diaphragm whereby in use the resonator frequency corresponds to a pressure applied to the diaphragm;

means for directing a light beam on to said resonator whereby to provide a first light signal modulated with the resonator frequency;

means for transmitting the first modulated signal to a remote station;

means associated with said resonator for providing from said light directing means a second light signal modulated with the resonator frequency;

photovoltaic means adjacent said resonator and arranged to receive said second modulated light signal and to generate a oscillatory electrical current in response thereto; and electromagnetic feedback means associated with the torsional resonator and coupled to the photovoltaic means whereby in use the resonator is maintained in an oscillatory condition at its resonant frequency.

2. A sensor device as claimed in claim 1, wherein the resonator includes a torsional resonator element mounted in a distortable frame member, said frame member being coupled to the diaphragm via a push rod, whereby displacement of the diaphragm distorts said frame thereby changing the frequency of the resonator element.

3. A sensor device as claimed in claim 2, wherein a permanent magnet is mounted on the resonator element, and wherein an electromagnet coupled to the photovoltaic means is disposed adjacent the resonator element whereby to provide an electromagnetic drive to that element.

4. A sensor device as claimed in claim 3, wherein said resonator comprises a body of single crystal silicon.

5. A sensor device as claimed in claim 4, wherein said housing is evacuated.

* * * * *